(12) United States Patent
Crisp et al.

(10) Patent No.: US 11,243,582 B2
(45) Date of Patent: Feb. 8, 2022

(54) INFORMATION HANDLING SYSTEM REFLECTIVE OUTER HOUSING

(71) Applicant: Dell Products L.P., Round Rock, TX (US)

(72) Inventors: Richard Andrew Crisp, Austin, TX (US); Richard William Guzman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/003,445

(22) Filed: Aug. 26, 2020

(65) Prior Publication Data

US 2020/0393877 A1 Dec. 17, 2020

Related U.S. Application Data

(62) Division of application No. 16/403,966, filed on May 6, 2019, now Pat. No. 10,788,868.

(51) Int. Cl.
*G06F 1/20* (2006.01)
*G06F 1/18* (2006.01)

(52) U.S. Cl.
CPC .............. *G06F 1/182* (2013.01); *G06F 1/20* (2013.01); *G06F 1/206* (2013.01)

(58) Field of Classification Search
CPC ...................................................... G01F 1/20
See application file for complete search history.

(56) References Cited

U.S. PATENT DOCUMENTS

| | | | |
|---|---|---|---|
| 5,928,076 A * | 7/1999 | Clements | H05K 9/0041 454/184 |
| 6,947,294 B2 * | 9/2005 | Lin | H05K 9/0041 174/383 |
| 7,385,659 B2 | 6/2008 | Kotchick et al. | |
| 7,609,517 B2 * | 10/2009 | Sun | H05K 7/20727 361/690 |
| 8,199,185 B2 | 6/2012 | McNelley et al. | |
| 8,400,415 B2 | 3/2013 | Sirotich et al. | |
| 2004/0264155 A1 | 12/2004 | Soule | |
| 2005/0175518 A1 | 8/2005 | Lin | |
| 2006/0037768 A1 | 2/2006 | Cochrane | |
| 2008/0147363 A1 | 6/2008 | Dalton | |
| 2008/0218969 A1 | 9/2008 | Muraki | |
| 2008/0291621 A1 | 11/2008 | Regimbal | |
| 2010/0258377 A1 | 10/2010 | Cash | |
| 2011/0234065 A1 | 9/2011 | Chang | |
| 2014/0321051 A1 | 10/2014 | Ng | |
| 2015/0253818 A1 | 9/2015 | Wong | |
| 2016/0034005 A1 | 2/2016 | Hoss | |
| 2018/0321716 A1 * | 11/2018 | Lien | G06F 1/20 |
| 2019/0090382 A1 | 3/2019 | Cho | |
| 2019/0197274 A1 * | 6/2019 | Guzman | G06K 19/06037 |

\* cited by examiner

*Primary Examiner* — Hung V Ngo
(74) *Attorney, Agent, or Firm* — Zagorin Cave LLP; Robert W. Holland

(57) ABSTRACT

An information handling system housing vents air at a grid of openings formed in a wall with a member extending outward from each intersection of the grid to define air channels. Each member terminates with a polished planar surface that reflects light against a flat underlying material. Variable angles of the polished planar surface relative to the plane of the wall creates a presentation of isolated reflections against the flat background that vary based upon a viewing angle of the housing wall.

11 Claims, 13 Drawing Sheets

INFORMATION HANDLING SYSTEM REFLECTIVE OUTER HOUSING

CROSS-REFERENCE TO RELATED APPLICATIONS

This application is a divisional of U.S. patent application Ser. No. 16/403,966, filed May 6, 2019, entitled "Information Handling System Reflective Outer Housing," naming Richard Andrew Crisp and Richard William Guzman as inventors, which application is incorporated herein by reference in its entirety.

BACKGROUND OF THE INVENTION

Field of the Invention

The present invention relates in general to the field of information handling system housings, and more particularly to an information handling system reflective outer housing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically integrate processing components in a housing that protects the processing components from damage. Information handling systems come in many different form factors that each rely on different types of housings having varied sizes and shapes. Portable information handling systems typically have smaller housings that often include rotationally coupled portions that open and close. Desktop information handling systems typically have larger housings designed to rest in a location accessible by an end user yet out of the way for most use cases. Some server information handling systems have stand-alone housings similar to desktop information handling systems that typically operate in a separate space, such as a server room or other communication hub location. Other server information handling systems fit into racks that typically operate in a data center having specialized environment controls.

Generally, information handling systems have physical interfaces at their housing that allow end user interactions. For example, most information handling systems include a power button to allow an end user to turn the system on and off. Often cable ports integrate in the housing at the external surface to accept communication and power cables. In some cases, modular hardware devices insert into slots accessible from the outer housing, such as hard drives that fit into slots of a server information handling system. Ports and slots often include markings on nearby outer surface areas to help end users understand the purpose of the port or slot, such as numbering of the port or slot. In addition, most information handling systems include some venting that encourages transfer of thermal energy from the interior of the housing to the external environment. For instance, active thermal management typically involves operating a cooling fan inside the housing that draws cooling airflow into an intake vent, across a thermal transfer structure and out an exhaust vent. In larger desktop and server information handling systems, a vent can take up a substantial portion of the housing outer surface so that impedance of cooling airflow is kept to a minimum. Often, information handling systems will include a bezel having an integrated vent that attaches to the housing.

One difficulty with manufacture of information handling system housings is that visible parting lines are often formed between housing portions at the location of the vent. Where information handling systems have strict mechanical tolerances for Class I and Class II cosmetic surfaces, such parting lines can lead to reduced manufacturing yields. In some instances, artwork that identifies ports and slots is included in filled in portions of venting so that adequate surface area is available for printing and/or molding the artwork. The result is an uneven appearance and disrupted or irregular airflow. As a result, venting is often viewed as an unattractive, if necessary, housing surface feature.

SUMMARY OF THE INVENTION

Therefore, a need has arisen for a system and method which more seamlessly integrates venting into an information handling system housing.

In accordance with the present invention, a system and method are provided which substantially reduce the disadvantages and problems associated with previous methods and systems for including venting at an information handling system housing. A housing wall extends members outward from and around the perimeter of openings to terminate at a planar surface having reflective characteristics relative to a flat non-reflective appearance of the wall and member. The reflective planar surface has a varied angle to present different appearances of points of light against the non-reflective underlying material based upon a viewing angle of the housing.

More specifically, an information handling system contains processing components in a housing that cooperate to process information, such as central processing unit (CPU) and memory. One or more walls of the housing integrate a grid of openings, such as to vent air between the interior and exterior of the housing. Plural members extend outward from the grid and terminate at a reflective planar surface that reflects light at plural angles relative to the plane of the grid and/or wall. For instance, a planar surface has a polished finish that reflects light relative to a flat finish of underlying material found in the member and/or wall so that individual reflections of light give an impression of floating against a dark background. The reflective planar surface may have a predetermined pattern that creates a desired reflected image based upon a viewing angle or random pattern that imitates bits of data flashing at the housing wall as a viewing angle changes. In various embodiments, the openings and the extension member planar surface have one or more of a variety of shapes, such as rectangle, square, circular, hexagonal and other shapes. Spacing of the openings may vary to achieve a desired air passage capacity for venting and to meet desired cosmetic effects, such as to hide housing parting lines between adjacent housing components.

The present invention provides a number of important technical advantages. One example of an important technical advantage is that an information handling system vent integrates at a housing in a seamless manner that hides parting lines. Reflective surfaces extending from vent perforations have polished and angled surfaces that contrast with underlying matte/flat surfaces to simulate bits of light floating in a dark background. Pseudo random angles of the reflective surfaces, such as generated or controlled with an algorithm, create an impression of many points of light that enhance the decorative appearance of the information handling system housing. Contrasting textures of the vent hide parting lines within the shadows of the reflective surfaces to allow for greater mechanical tolerances while improving system aesthetics and creating a unique appearance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system outer housing surface exposes plural variable angled polished planar surfaces to simulate bits of light with reflections that change with viewing angle. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
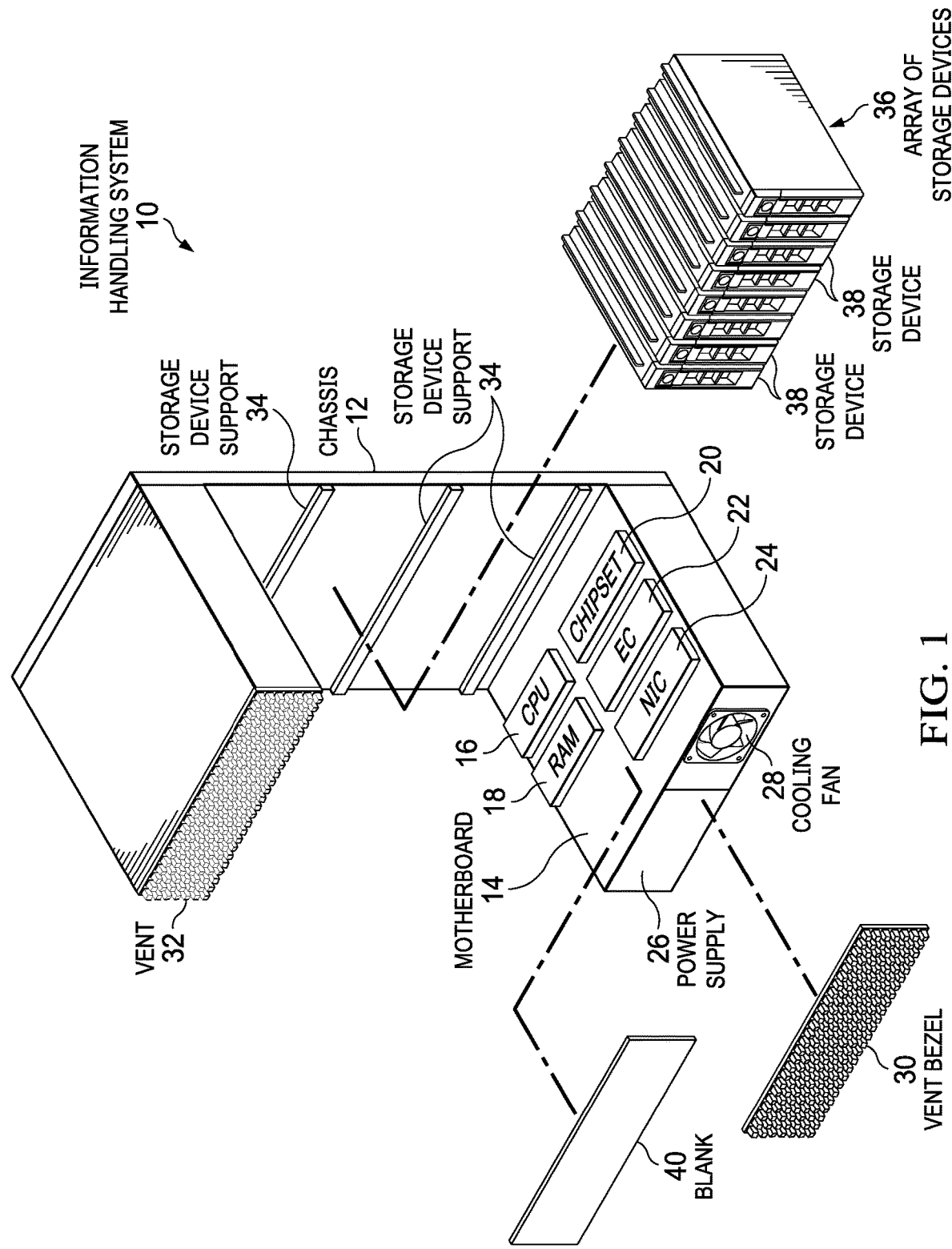
FIG. 1 depicts an exploded view of an information handling system having an external housing surface with exposed members that terminate in variable angled polished planar surfaces.

Referring now to FIG. 1, an exploded view depicts an information handling system 10 having an external housing surface with exposed members that terminate in variable angled polished planar surfaces. In the example embodiment, information handling system 10 is a storage server that integrates a plurality of storage devices 38 arranged in a linear array 36 to fit in a chassis 12. A motherboard 14 interfaces processing components that execute an operating system and applications to serve information. For example, a central processing unit (CPU) 16 executes instructions stored in a random access memory (RAM) 18 under the management of a chipset 20. An embedded controller 22 executes firmware code to manage application of power, thermal conditions and interaction with input/output devices, such as keyboard and mouse. A network interface card (NIC) 24 provides a network interface, such as with Ethernet or other communication devices. A power supply 26 provides power to the processing components, such as based upon control logic executing on embedded controller 22. A cooling fan 28 generates a cooling airflow to reject thermal energy generated by the processing components within chassis 12 to the outside environment. In various embodiments, cooling fan 28 may draw air from within chassis 12 to expel the air or may draw air into chassis 12 to expel the air at a local vent 30 or distal vent 32. The example embodiment is presented to depict an example of how information handling system 10 may process information so that those of skill in the art will understand that other types of information handling systems may also be used, such as portable information handling systems, desktop information handling systems and other types of server information handling systems.

In the example embodiment, several faces of the chassis 12 are covered by walls that include decorative members to independently reflect bits of light. For example, a vent bezel 30 is a cover that couples over power supply 26 and cooling fan 28 to pass cooling air between chassis 12 and the external environment. An upper vent 32 integrates with chassis 12 as a fixed part of information handling system 10. Other decorative members are optionally included with chassis 12 depending upon the hardware configuration of information handling system 10. For instance, in the example embodiment, storage device supports 34 integrated in chassis 12 selectively couple to arrays 36 of storage devices 38 that interface with motherboard 14 to provide additional storage for storage server functionality. Blanks 40 that include the decorative members fit into chassis 12 to fill in empty spaces when storage devices are not installed. As described below in greater detail, the decorative elements blend parting lines in an effective manner.

Figure 2:
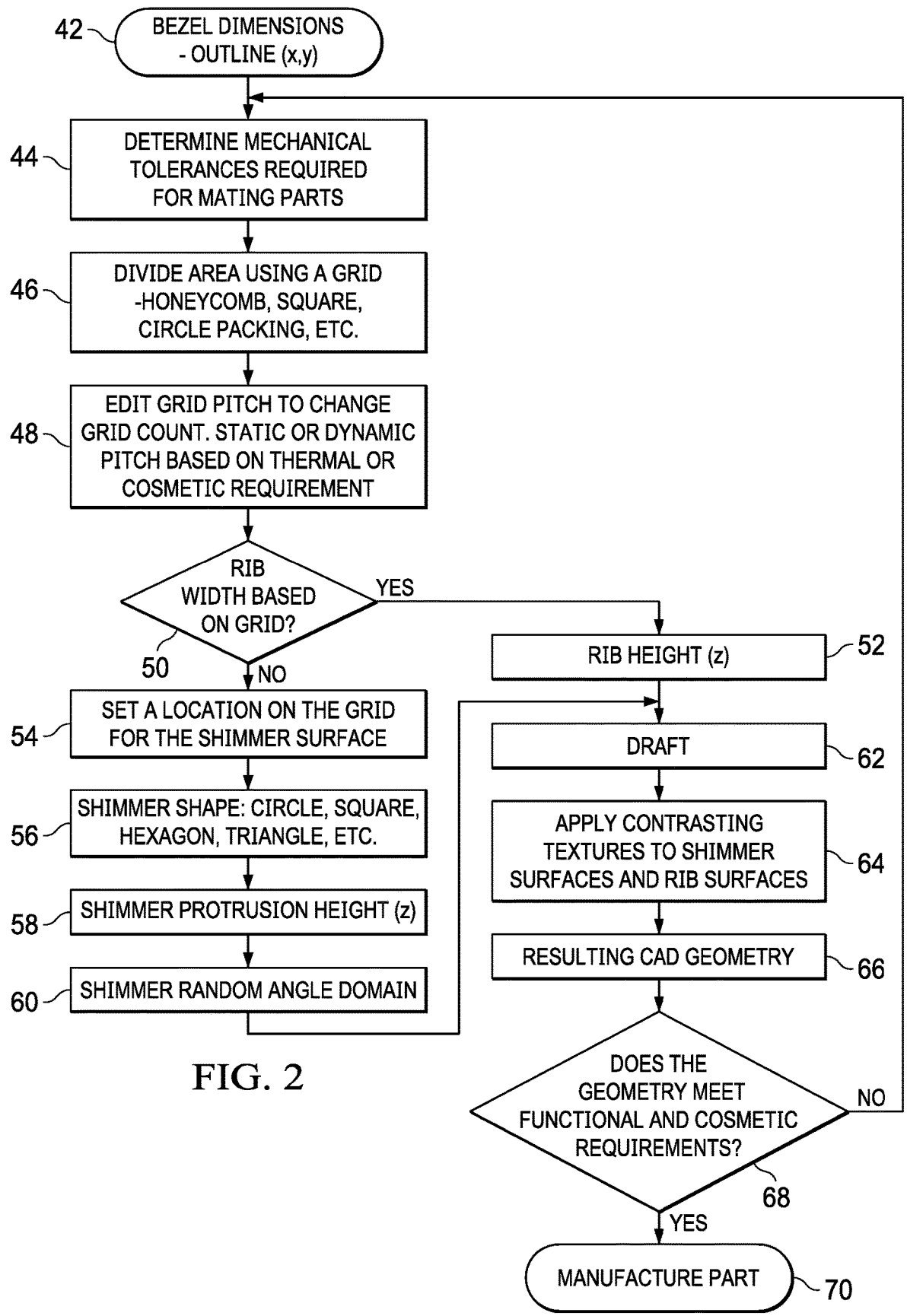
FIG. 2 depicts a flow diagram of a process for configuring a vent with reflective extension members.
Figure 3:
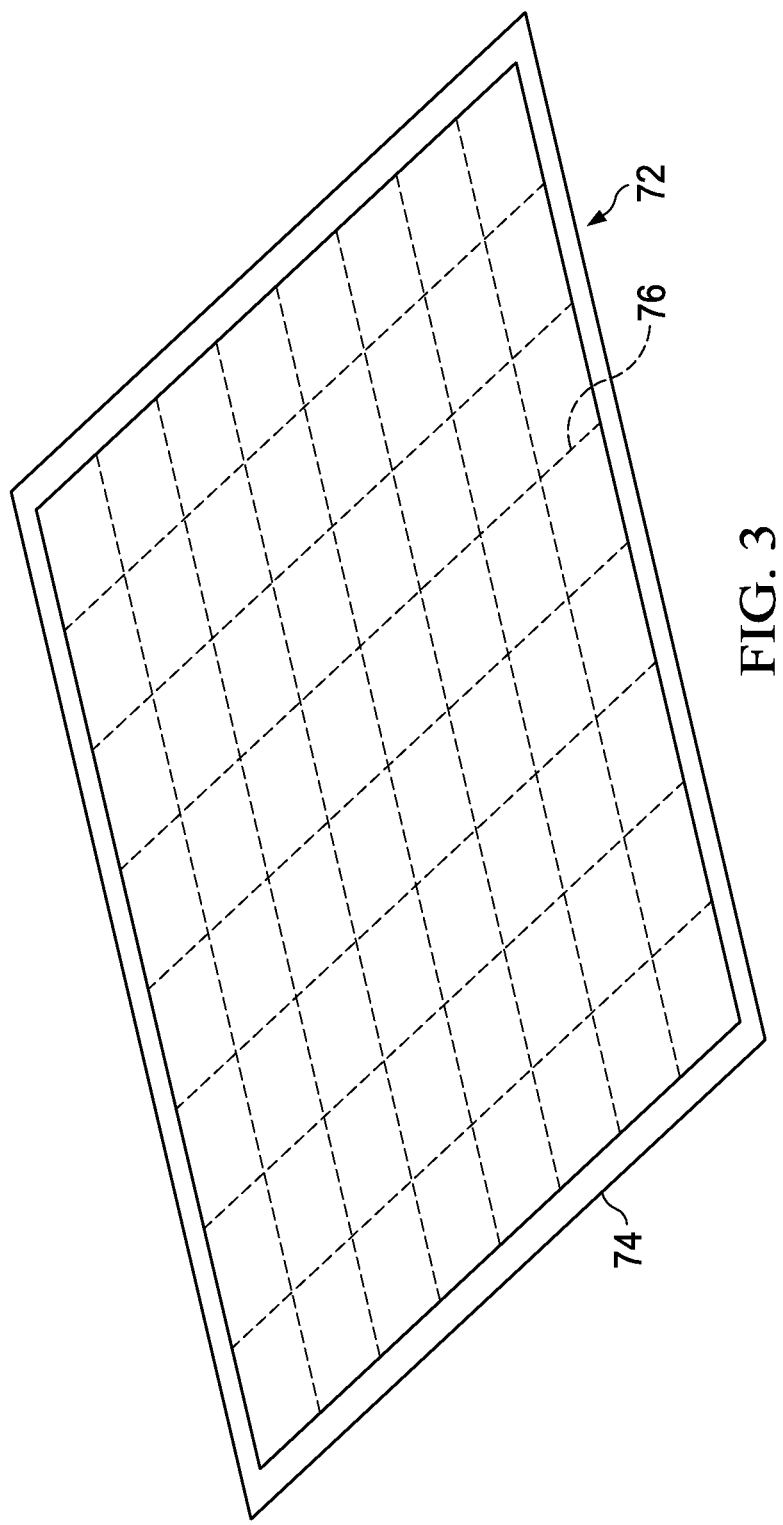
FIG. 3 depicts an example of a layout of an information handling system chassis wall or bezel cover to determine mechanical tolerances.

Referring now to FIG. 2, a flow diagram depicts a process for configuring a vent with reflective extension members. The process starts at step 42 with determination of the size of the venting surface area, such as the dimensions of a bezel sized to fit over a portion of a chassis. At step 44 a determination is made of the mechanical tolerances required for the mating parts of the information handling system, such as along a parting line between a venting surface area and chassis housing wall. As depicted by FIG. 3, a perimeter 74 around a layout 72 defines how precisely the venting surface area should align against proximate housing structures, such as walls integrated in a chassis. At step 46, the layout 72 is divided into grids 76 based upon the mechanical tolerances and size of layout 72. The example embodiment of FIG. 3 depicts even sized grids 76 defined across layout 72 within the perimeter 74 related to precision of the housing portion layout. In alternative embodiments, the gird may define square, rectangular, honeycomb, circle packing, hexagonal and other shapes based upon a desired venting performance. At step 48, the grid pitch is adjusted to change the grid count for the desired thermal or cosmetic requirements. The pitch of grid 76 may remain static or include dynamic size adjustments across layout 72. That is, in some embodiments even-sized grids 76 define even-sized and regularly spaced openings for venting, while in other embodiments dynamic grid sizes change opening sizes and spacing to achieve a desired appearance and thermal transfer.

Figure 4:
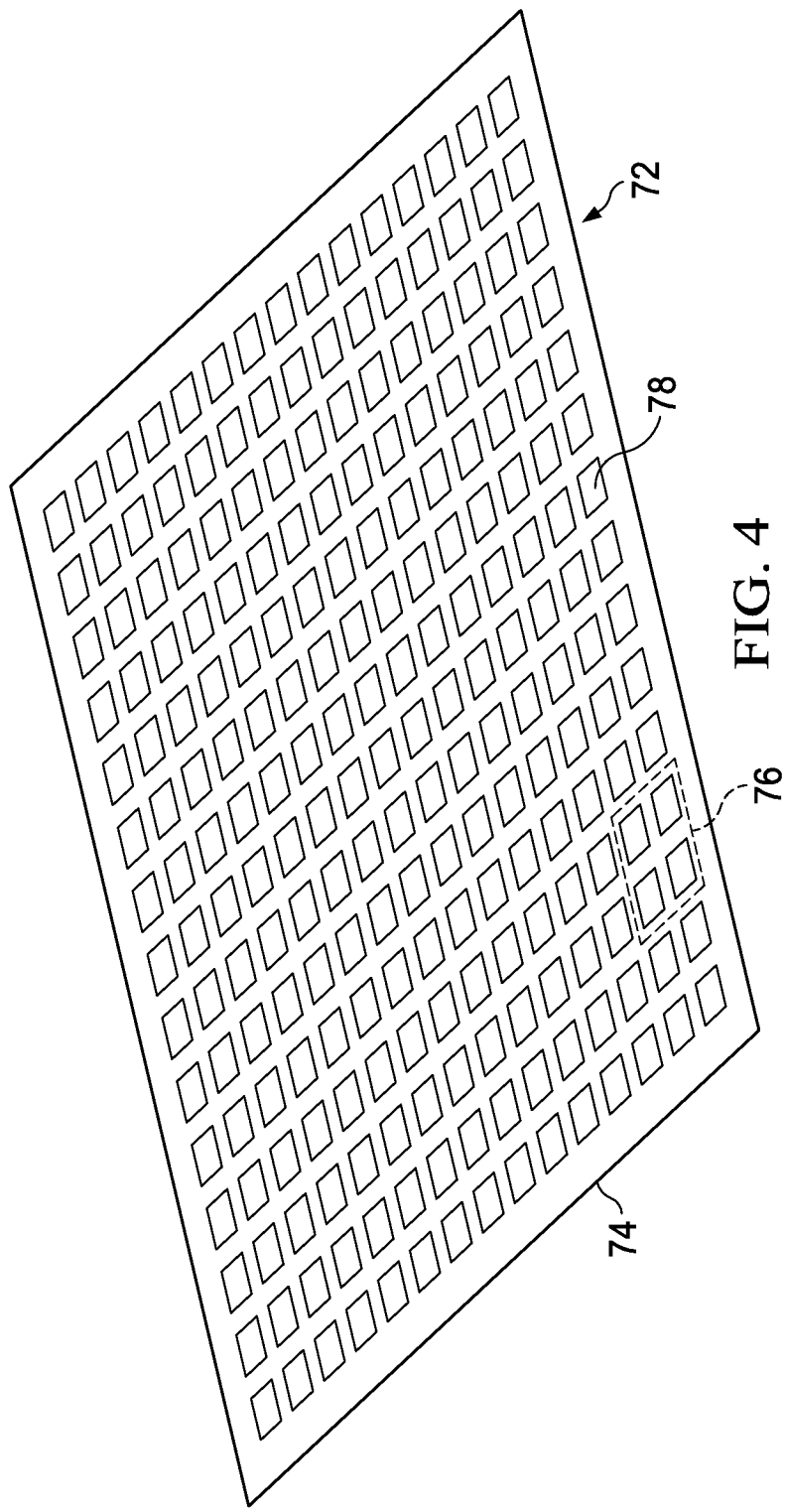
FIG. 4 depicts an example of a layout of an information handling system chassis wall or bezel cover to determine rib width between vent openings.
Figure 5:
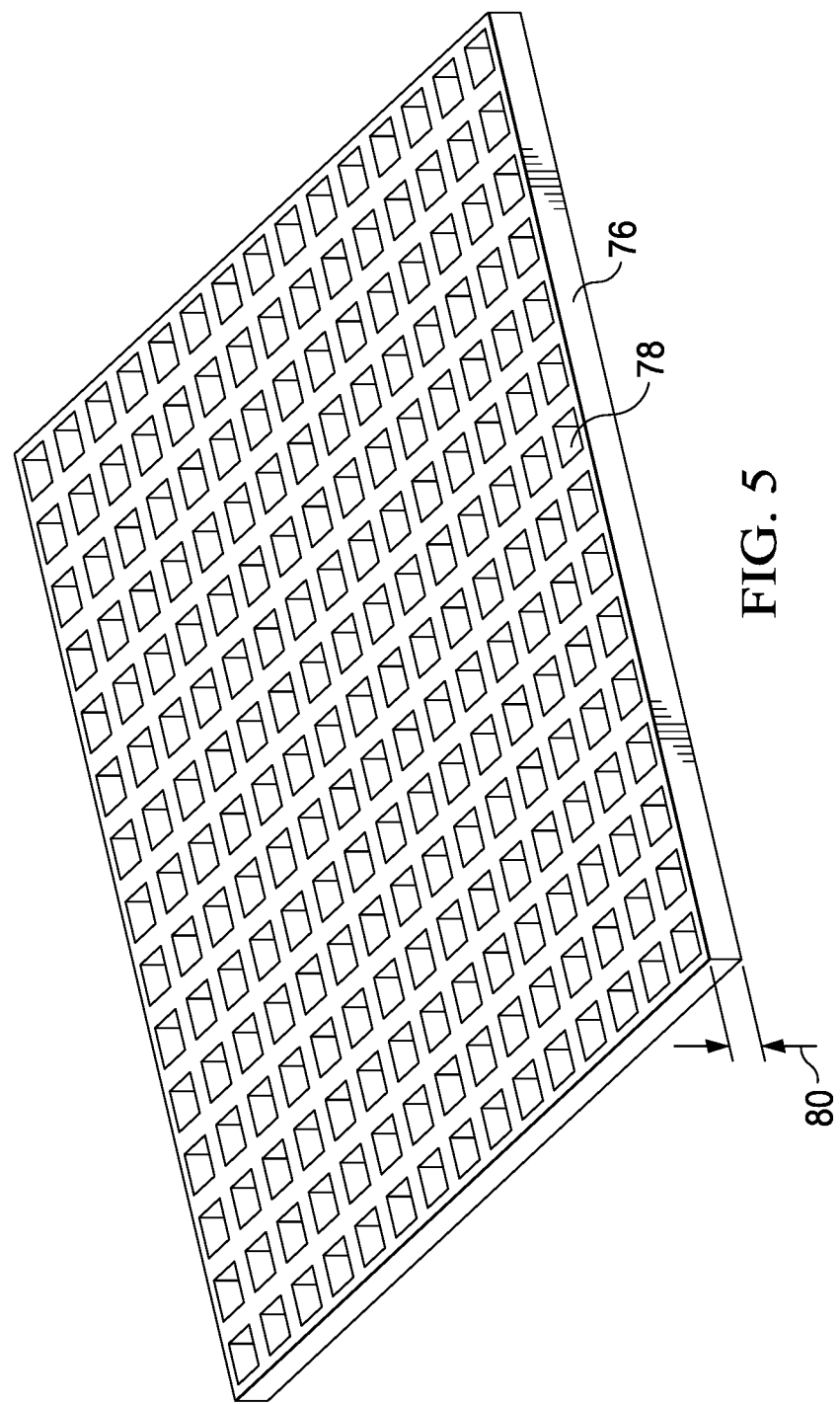
FIG. 5 depicts an example of a layout of an information handling system chassis wall rib height for ribs between grids that define an air channel to each opening.
Figure 6:
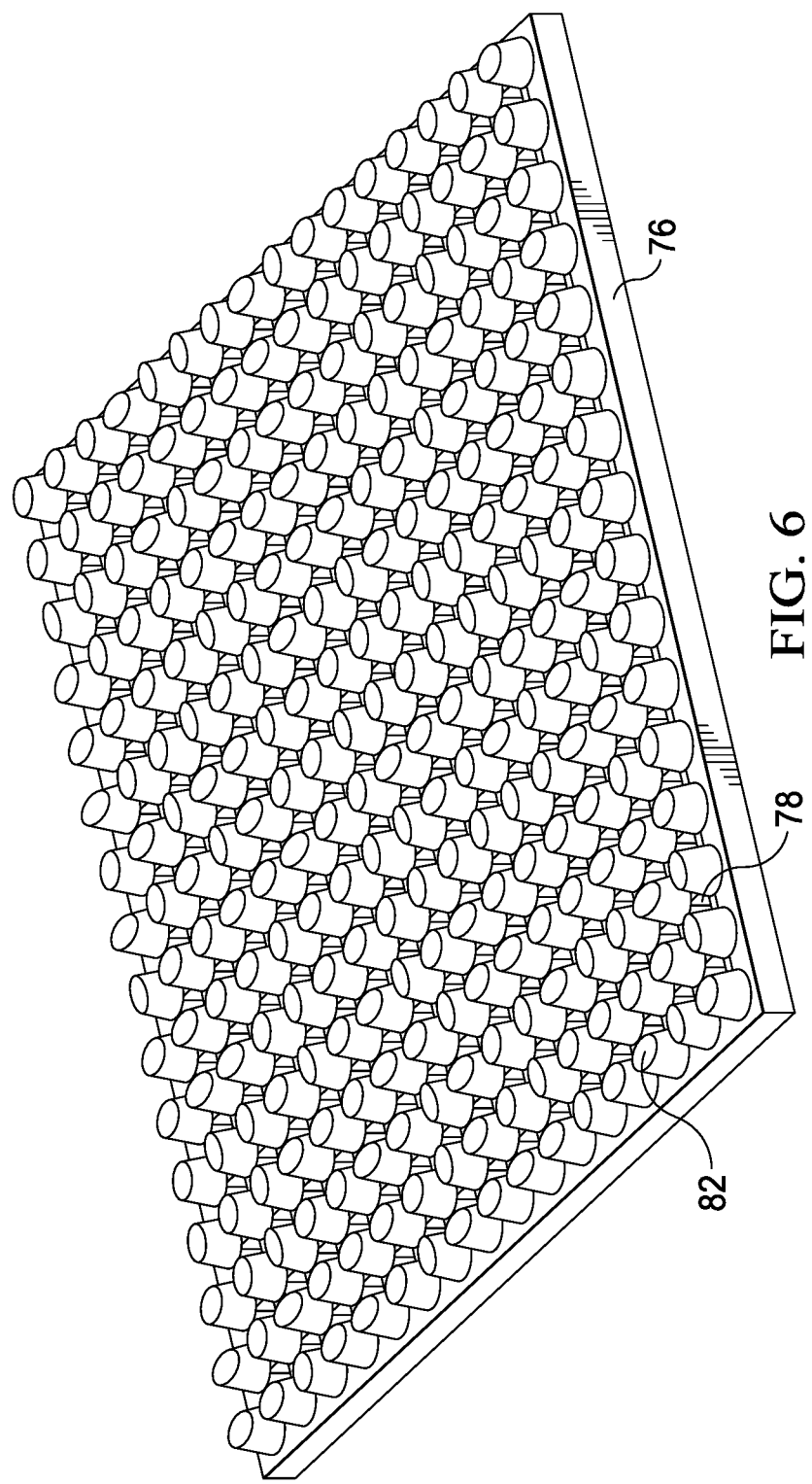
FIG. 6 depicts an example embodiment of a vent bezel having polished planar surface exposed at a terminating end of each member extending form the rib intersections.

At step 50 a determination is made of whether rib width for extending members is based upon gird layout. For instance, if the housing piece does not have a venting function so that opening size is not important or openings are not formed, the process continues to step 52 to determine the rib height. If at step 50 rib width is based upon the grid, the process continues to step 54 to set a location on the grid for the reflective extension members that produce the "shimmer" effect of individual reflective bits of light. As depicted by FIG. 4, vent openings 78 of a square shape are defined within grids 76 that sets a rib width between each vent opening 78. The intersections between rows and columns formed by openings 78 set a size of the extension member that supports the reflective surface. In alternative embodiments, vent openings 78 may have circular, hexagonal, rectangular or other shapes with static or dynamically sized rib widths. The process continues to step 56 to define a reflective surface shape, which can have the same shape as vent opening 78 or a different shape. For instance, in the example embodiment square vent openings 78 are set to a height 80 illustrated by FIG. 5 with each intersection of grids 76 supporting a circular shaped extension member as depicted by FIG. 6. The height 80 of ribs formed between grids 76 is determined at step 58 based upon a desired appearance and vent performance. For instance, as depicted by FIG. 5, height 80 of grids 76 defines an air channel through which each vent opening 78 communicates air. Height 80 of grids 76 also provide a vertical separation of the polished planar surface 82 formed on each extending member from opening 78 to provide a desired aesthetic effect.

At step 60, an angular relationship of each polished planar surface 82 is determined relative to the plane of the layout 72. In the example embodiment, the reflective angle of each polished planar surface is randomly set at each grid 76 relative to the plane of layout 72. Thus, for instance, when the finished bezel vent is coupled to an information handling system chassis wall, each polished planar surfaces 82 reflect light away from the chassis wall at an angle that varies within a predetermined amount from perpendicular to layout 72. The range of angular variation for the plane of each polished planar surface 82 relative to the plane of layout 72 may be, in one example embodiment, up to 30 degrees of variation. In alternative embodiments, larger or smaller variations in the allowed angular difference of planar surface 82 and layout 72 may be used to provide a desired visual effect. For instance, reflection from each polished planar surface 82 depends upon ambient light conditions and end user viewing angle. Larger variances of the angle of the plane of layout 72 and polished planar surface 82 will increase the effect of scattered bits of light moving across the bezel vent relative to smaller angular variances. The example embodiment of FIG. 6 illustrates circular polished planar surfaces 82 located at each intersection of grids 76 forming square vent openings 78. As described above, other combinations of shapes may be used as may varying sizes of planar surfaces 82 and grids 76. For instance, square and circular polished planar surfaces may be combined to provide a unique aesthetic appearance. Further, non-random alignment of polished planar surfaces 82 may be used to generate predetermined visual effects, such as a company logo or name that reflects back at an end user from certain angles or moves across a housing wall as viewing angles change.

At step 62 a draft of the designed housing portion is generated, such as with additive manufacturing. At step 64 the draft has contrasting textures applied to create the desired visual effect. For example, a flat or other non-reflective finish at the housing portion surfaces creates a dark background so that a polished or other reflective finish at the planar surface 82 will illuminate more brightly when a viewing angle reflects light from the surface relative to the underlying material. As a viewing angle changes in a given set of ambient light conditions, reflections from different polished planar surfaces 82 will reflect light to create an impression similar to bits of information flashing across the housing portion. At step 66, computer assisted drawings of the design are presented with other portions of the housing so that at step 68 a determination is made of whether the defined geometry for the bezel or other housing portions meets desired functional and cosmetic requirements. If so, the process is complete at step 70 with manufacture of the housing.

Figure 7:
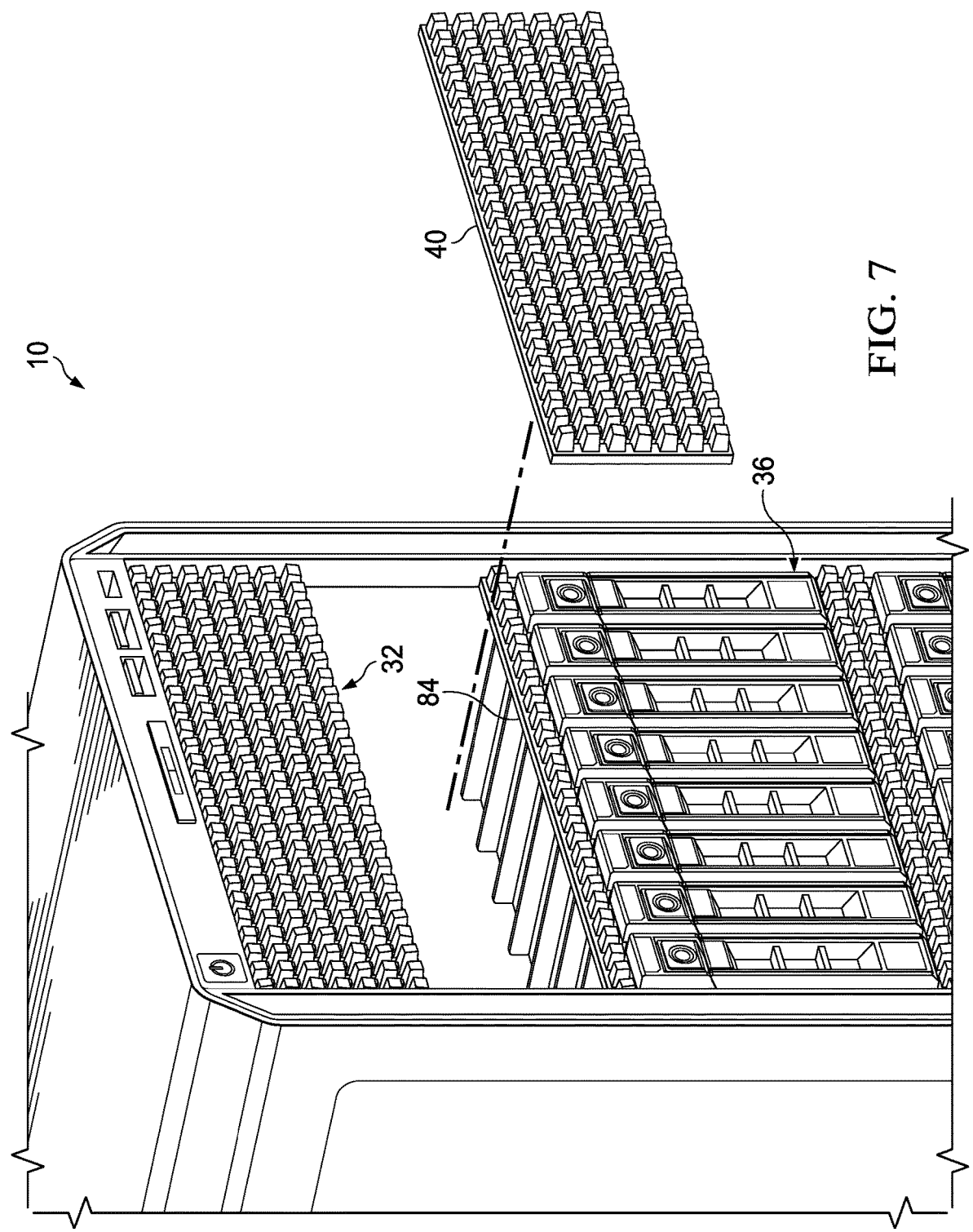
FIG. 7 depicts an example embodiment of an information handling system having a vent and a housing blank disposed as an outer chassis wall.

Referring now to FIG. 7, an example embodiment depicts an information handling system having a vent 32 and a housing blank 40 disposed as an outer chassis wall. In the example embodiment, blank 40 is removed from chassis 12 to support installation of storage devices 36. Both blank 40 and vent 32 have an underlying rectangular grid of rectangular openings with a regular spaced pattern of same-size grids. A member extends upward from each grid intersection corner to terminate in a like sized polished planar surface aligned at variable angular alignments within a range of a parallel alignment to the side wall of information handling system 10. A border 84 is defined around blank 40 to visually integrate with the edge of blank 40 when blank 40 is installed. Similarly, vent 32 and blank 40 have reflective planar surfaces 82 aligned on installation to provide a cosmetic appearance of a single chassis wall at the outer surface of information handling system 10.

Figure 8:
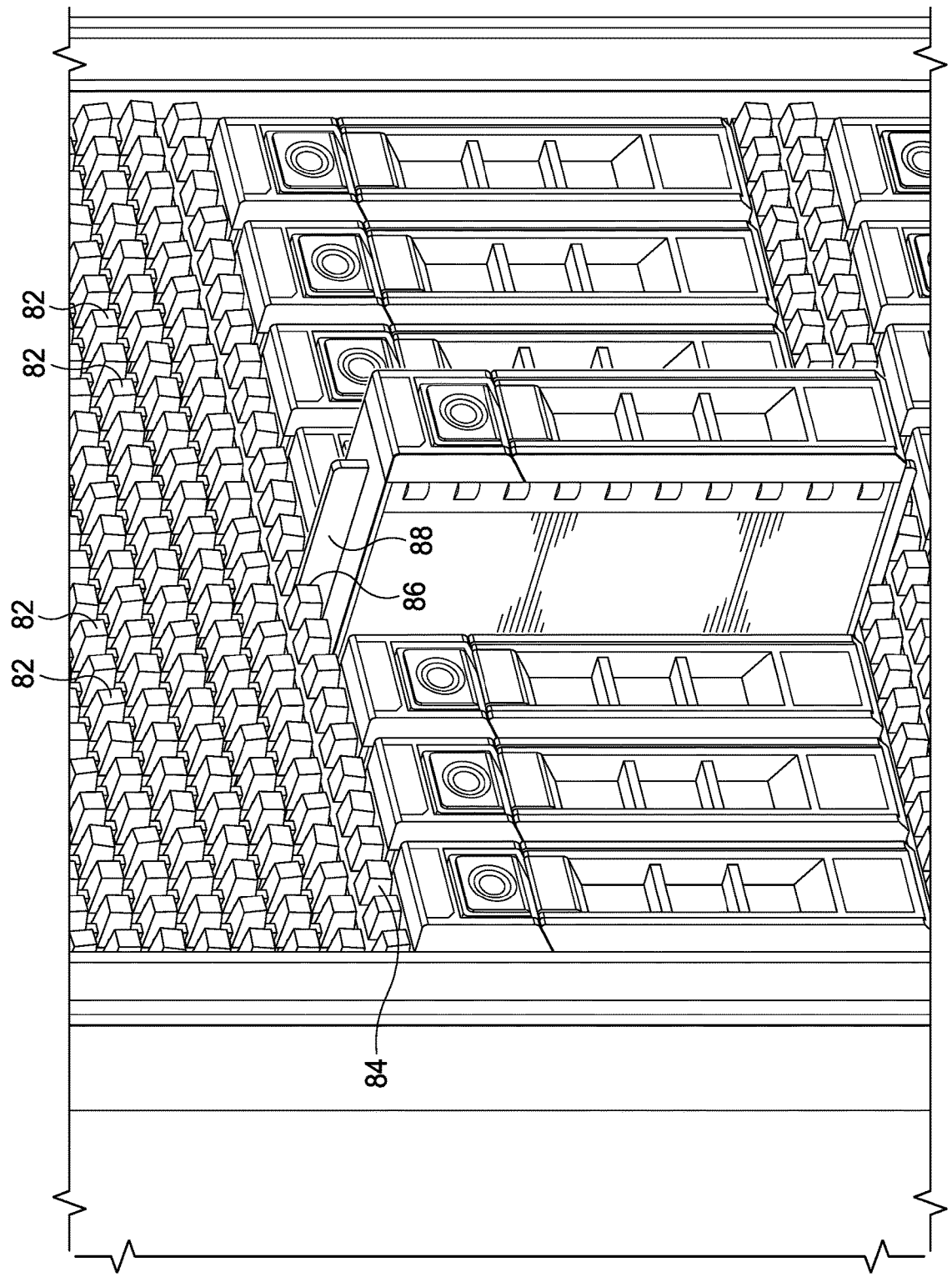
FIG. 8 depicts a side view of an information handling system having a storage device guide and rail that cooperate to insert and remove storage devices from a chassis.

Referring now to FIG. 8, a side view of an information handling system 10 depicts a storage device guide 86 and rail 88 that cooperate to insert and remove storage devices 36 from chassis 12. In the example embodiment, a storage device 36 is partially slid out of chassis 12 at a rib of a border 84 where rail 88 is aligned. In the example embodiment, polished planar surfaces 82 extend outward with variable angles to reflect light in a random pattern across the face of chassis 12. Polished planar surfaces of border 84 blend with those of vent 32 to present a uniform appearance that hides parting lines between the separate housing wall portions.

Figure 9A:
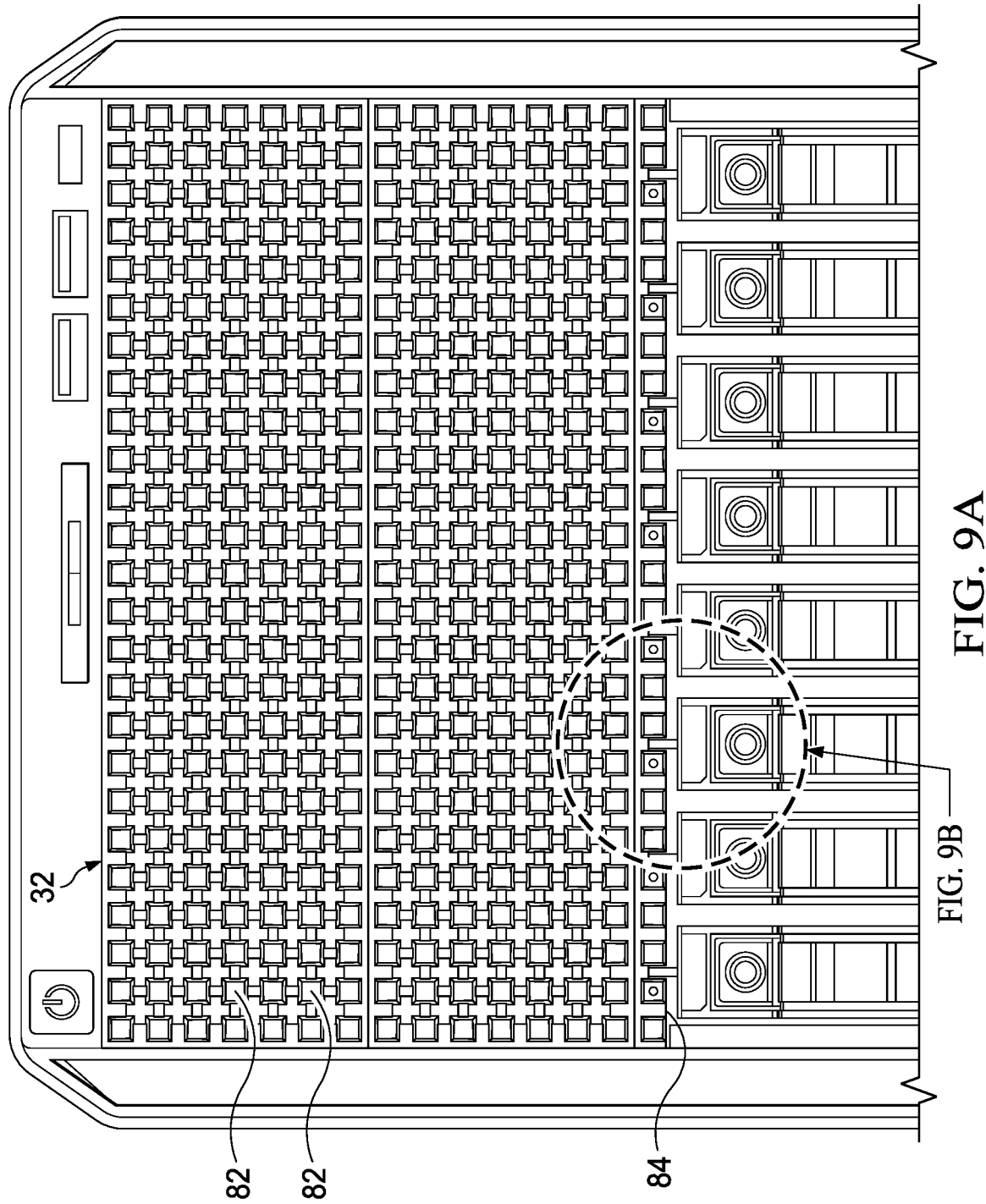
FIGS. 9A and 9B depict a side view of an information handling system having symbols that blend into the housing wall structure of separate assembled housing portions.
Figure 9B:
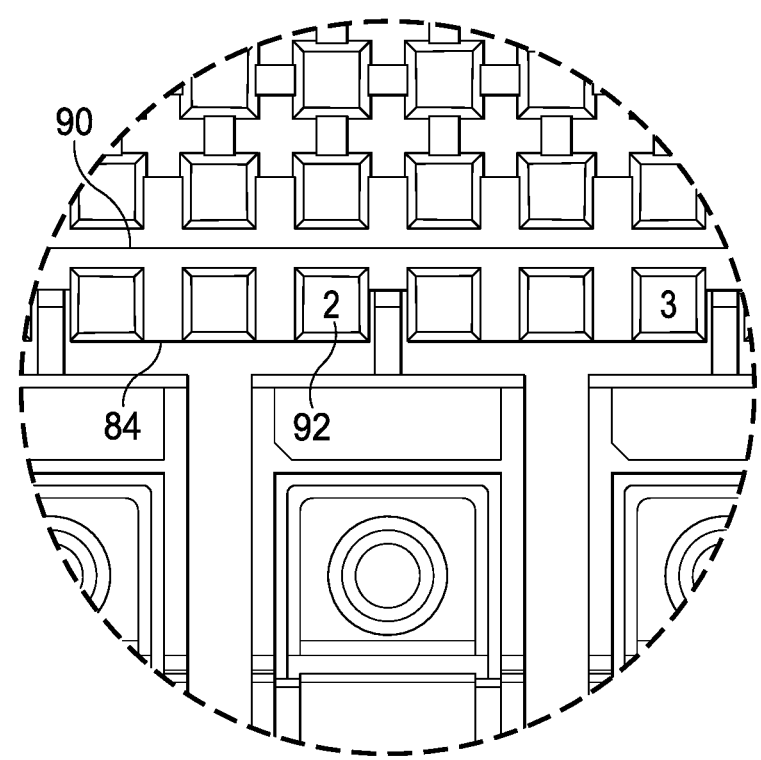

Referring now to FIG. 9A, a side view of an information handling system 10 depicts symbols 92 that blend into the housing wall structure of separate assembled housing portions. In the example embodiment, a planar surface 82 is treated with a flat or other non-reflective finish so that symbol 92 is printed on or molded into a desired position. In the example embodiment, numbering is provided for the storage device slots that accept storage devices 36 from slot zero through slot seven. The closeup view of FIG. 9B depicts the precision with which parting line 90 is defined along the border with a vent 32 or other blank 40.

Figure 10:
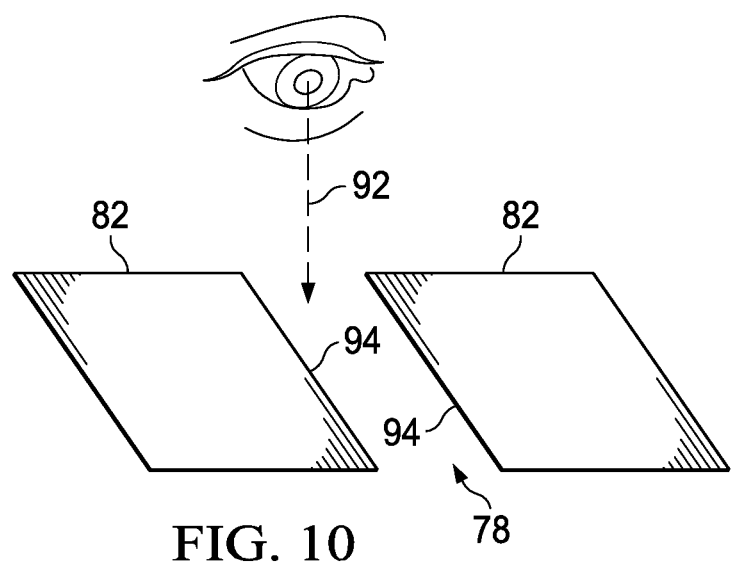
FIG. 10 depicts a side cutaway view of a vent bezel having an example embodiment that enhances a flat background behind polished planar surfaces.

Referring now to FIG. 10, a side cutaway view of a vent bezel depicts an example embodiment that enhances a flat background behind polished planar surfaces 82. In the example embodiment, the air channel defined from opening 78 out past polished planar surfaces 82 has an angled pathway off perpendicular to the vent bezel so that air exiting the interior of information handling system 10 is directed to the left as shown by the example embodiment. In addition to providing directional control of airflow from information handling system 10, the sideways shift of the exit opening at the vent outer surface relative to the inner opening 78 provides a direct viewing angle at a flat finish area 94. The visual effect is that an end user looking directly at information handling system 10 will have a consistent flat finish background between the extension members that terminate with polished planar surfaces 82. This flat background will further highlight the bits of light that illuminate as view angle changes which planar surfaces reflect light.

Figure 11:
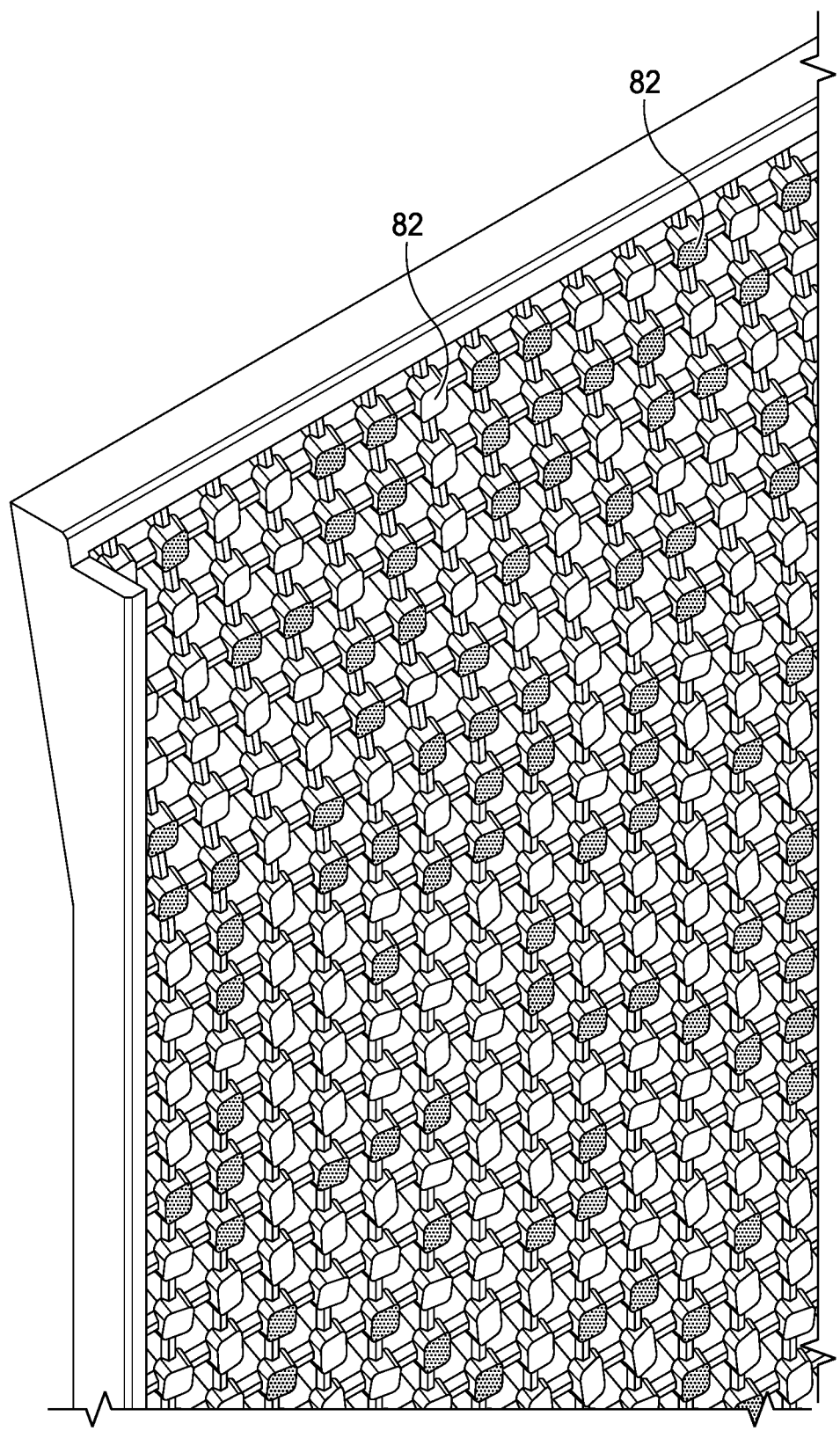
FIG. 11 depicts an information handling system having reflective planar surfaces at a first viewing angle.
Figure 12:
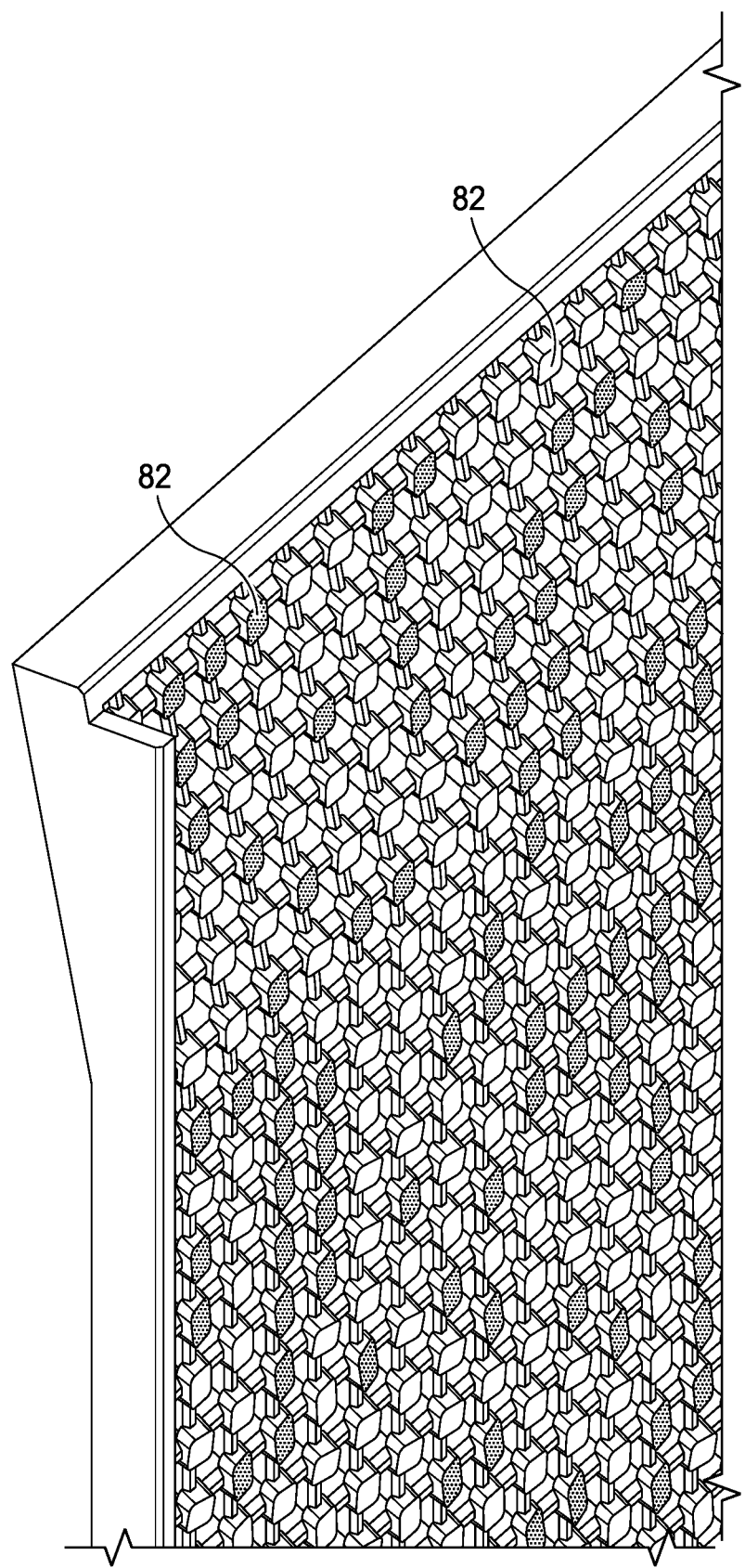
FIG. 12 depicts an information handling system having reflective planar surfaces at a second viewing angle.
Figure 13:
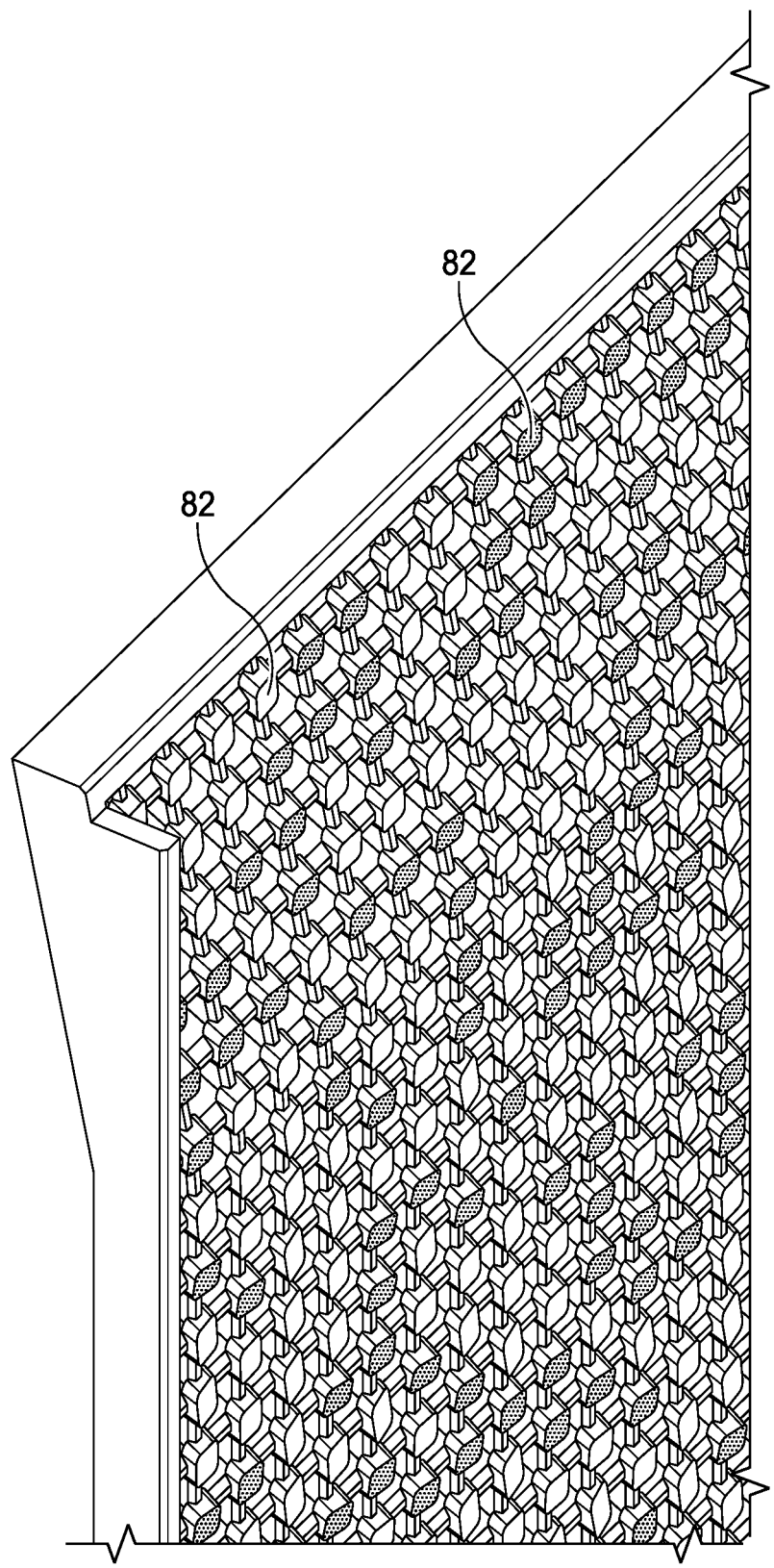
FIG. 13 depicts an information handling system having reflective planar surfaces at a third viewing angle.

Referring now to FIGS. 11, 12 and 13, an information handling system 10 is depicted having reflective planar surfaces 82 at first, second and third viewing angles. At each viewing angle, different reflective planar surfaces 82 illuminate by reflection of light to provide an impression of bits of data moving across the outer surface of chassis 12 of information handling system 10.

Although the present invention has been described in detail, it should be understood that various changes, substitutions and alterations can be made hereto without departing from the spirit and scope of the invention as defined by the appended claims.

What is claimed is:

1. A method for manufacture of an information handling system, the method comprising:
   forming a grid of plural openings in a wall to vent air through the wall;
   extending material out from one side of the wall at plural intersections of the grid; and
   terminating at least some of the extending material at a planar surface having a reflective finish, the planar surface of each extending material having a variable offset angle of not greater than a predetermined amount from parallel alignment to the wall;
   wherein the extending material and wall have a flat finish, different than the extending material planar surfaces reflecting finish.

2. The method of claim 1 further comprising:
   defining a channel from each of the plural openings through the wall with the extending material; and
   directing air from at least some of the channels at an angle offset from perpendicular to the wall.

3. The method of claim 1 wherein the terminating at least some of the extending material further comprises randomly setting the variable angle.

4. The method of claim 1 further comprising forming the extending material plane as a circle.

5. The method of claim 1 further comprising forming the extending material plane as a hexagon.

6. The method of claim 1 wherein the wall comprises a bezel configured to couple to an information handling system housing.

7. A vent comprising:
   a wall having plural openings to pass air, the openings defining plural intersections; and
   a member extending upward from each of the plural intersections;
   wherein the wall and members have a flat finish except that each member terminates distal the wall with a polished planar surface, each polished planar surface having a variable offset angle of not greater than a predetermined amount from parallel alignment to the wall.

8. The vent of claim 7 wherein the plural openings comprise hexagons and the polished planar surface has a circular shape.

9. The vent of claim 7 wherein the plural openings comprise circles and the polished planar surface has a square shape.

10. The vent of claim 7 further comprising a channel formed from each opening to each the planar surface, the member extending upward off an axis perpendicular to the wall.

11. The vent of claim 7 wherein the variable offset angle of the planar surface is randomly set.

* * * * *